(12) United States Patent
Geier

(10) Patent No.: US 8,857,802 B1
(45) Date of Patent: Oct. 14, 2014

(54) MELON CUTTING BOARDS

(76) Inventor: Gary J. Geier, Sioux Falls, SD (US)

(*) Notice: Subject to any disclaimer, the term of this patent is extended or adjusted under 35 U.S.C. 154(b) by 0 days.

(21) Appl. No.: 13/549,464

(22) Filed: Jul. 14, 2012

Related U.S. Application Data

(60) Provisional application No. 61/508,476, filed on Jul. 15, 2011, provisional application No. 61/645,039, filed on May 9, 2012.

(51) Int. Cl.
*B23Q 3/00* (2006.01)
*B23Q 1/00* (2006.01)
*A47J 37/08* (2006.01)
*A23G 1/10* (2006.01)
*A47J 47/00* (2006.01)

(52) U.S. Cl.
USPC .................................. 269/9; 99/401; 99/485

(58) Field of Classification Search
USPC ............................................................ 269/9
See application file for complete search history.

(56) References Cited

U.S. PATENT DOCUMENTS

| | | | |
|---|---|---|---|
| 93,844 A | 8/1869 | Sykes | |
| 152,331 A | 6/1874 | Cass | |
| 190,688 A | 5/1877 | Mathewson | |
| 345,528 A | 7/1886 | Mitchell | |
| 361,742 A | 4/1887 | Bennett | |
| 566,479 A | 8/1896 | Sellman | |
| D38,950 S | 12/1907 | Anderson | |
| 922,495 A | 5/1909 | Lust | |
| 943,767 A | 12/1909 | Bullard | |
| 1,754,998 A * | 4/1930 | Geartts | 211/85.4 |
| 1,962,799 A | 6/1934 | Whitmarsh | |
| D93,163 S | 8/1934 | Hart | |
| 2,023,470 A | 12/1935 | Hart | |
| 2,104,278 A | 1/1938 | Schultz | |
| 2,147,800 A | 2/1939 | Sadowski | |
| 2,257,970 A | 10/1941 | Long | |
| 2,460,957 A | 2/1949 | Whitfield | |
| 2,464,114 A | 3/1949 | Bloecher | |
| D161,596 S | 1/1951 | Russ | |
| 2,536,268 A | 1/1951 | Dillon | |
| D162,101 S | 2/1951 | Wells | |
| 2,599,681 A | 6/1952 | Wells | |
| D167,750 S | 9/1952 | Karoff | |
| D168,098 S | 11/1952 | Klein | |
| D168,304 S | 12/1952 | Klein | |
| 2,620,003 A | 12/1952 | Perdue, Jr. | |
| D170,338 S | 9/1953 | Randall | |
| 2,751,951 A | 6/1956 | Strathaus | |
| 2,942,639 A | 6/1960 | Margolis | |

(Continued)

*Primary Examiner* — Lee D Wilson
*Assistant Examiner* — Alvin Grant
(74) *Attorney, Agent, or Firm* — Albert W. Watkins

(57) ABSTRACT

A generally square base serving tray is subdivided generally diagonally into three sections by partial-height walls and having partial-height support pads at opposite ends of the diagonal perpendicular to the sections, and an irregular oval or boat-shaped cutting and serving tray configured to nestle to the bottom of and within a center diagonal section of the base serving tray or alternatively rest elevated above the partial-height walls between a pair of partial-height support pads. The base serving tray and the nestled cutting tray each have lids permitting food to be stored therein. The nestled cutting tray lid is further designed to serve as an alternative flat cutting board with a juice groove defined by the lid closure lip. The unique geometry of the upper rim of the cutting tray, illustrated in an alternative four-member construction, accommodates melons of various sizes, and secures them against sliding or rolling during cutting.

13 Claims, 11 Drawing Sheets

(56) References Cited

U.S. PATENT DOCUMENTS

| | | | |
|---|---|---|---|
| 3,030,994 A | 4/1962 | Wysowski | |
| D198,386 S | 6/1964 | Neuberg | |
| D205,676 S | 9/1966 | Kirwan et al. | |
| D208,830 S | 10/1967 | Stockdale | |
| D226,393 S | 2/1973 | Greenstein | |
| 3,995,844 A | 12/1976 | Hellman | |
| D248,712 S | 8/1978 | Guibert | |
| 4,126,775 A * | 11/1978 | Wyatt | 219/400 |
| 4,140,340 A | 2/1979 | Cloutier | |
| D281,850 S | 12/1985 | Morin | |
| 4,684,113 A | 8/1987 | Douglas et al. | |
| D300,197 S | 3/1989 | Tingle | |
| 4,930,759 A * | 6/1990 | Potter et al. | 269/54.5 |
| 4,989,846 A | 2/1991 | Quinn | |
| D330,148 S | 10/1992 | Pinkston | |
| 5,274,216 A * | 12/1993 | DeGrow et al. | 219/386 |
| 5,311,813 A * | 5/1994 | Fairbanks et al. | 99/645 |
| 5,366,208 A | 11/1994 | Benjamin | |
| 5,431,091 A * | 7/1995 | Couture | 99/401 |
| 5,499,666 A * | 3/1996 | Foster et al. | 141/98 |
| 5,514,443 A * | 5/1996 | Chen | 428/99 |
| 5,527,022 A | 6/1996 | Gibson | |
| 5,580,037 A | 12/1996 | Gore | |
| 5,598,759 A | 2/1997 | Sie et al. | |
| D380,940 S * | 7/1997 | Conner | D7/640 |
| 5,850,784 A * | 12/1998 | Conner | 99/485 |
| 5,907,989 A | 6/1999 | Sie et al. | |
| 6,206,356 B1 | 3/2001 | Beloff | |
| D462,877 S | 9/2002 | Lillelund et al. | |
| D469,319 S | 1/2003 | Pettaweebuncha | |
| 6,994,334 B2 * | 2/2006 | Jones et al. | 269/289 R |
| 7,134,653 B1 | 11/2006 | Ladenheim | |
| D539,612 S | 4/2007 | Foss | |
| 7,428,864 B2 * | 9/2008 | Wengrovsky | 99/646 C |
| D584,108 S | 1/2009 | Olsson | |
| D597,379 S | 8/2009 | Changpan | |
| D598,715 S | 8/2009 | Foss | |
| D603,655 S * | 11/2009 | Lin | D7/553.6 |
| 7,874,449 B1 | 1/2011 | Studee et al. | |
| D634,584 S | 3/2011 | Bergkvist | |
| 8,006,369 B2 * | 8/2011 | Shew et al. | 29/527.1 |
| 8,220,789 B2 * | 7/2012 | Pourounidis et al. | 269/289 R |
| 2004/0166207 A1 | 8/2004 | Vincent et al. | |
| 2005/0224506 A1 | 10/2005 | Withers | |
| 2009/0120937 A1 | 5/2009 | Vovan | |
| 2009/0200316 A1 | 8/2009 | Kovacevich et al. | |
| 2012/0305439 A1 | 12/2012 | Lomeli et al. | |

* cited by examiner

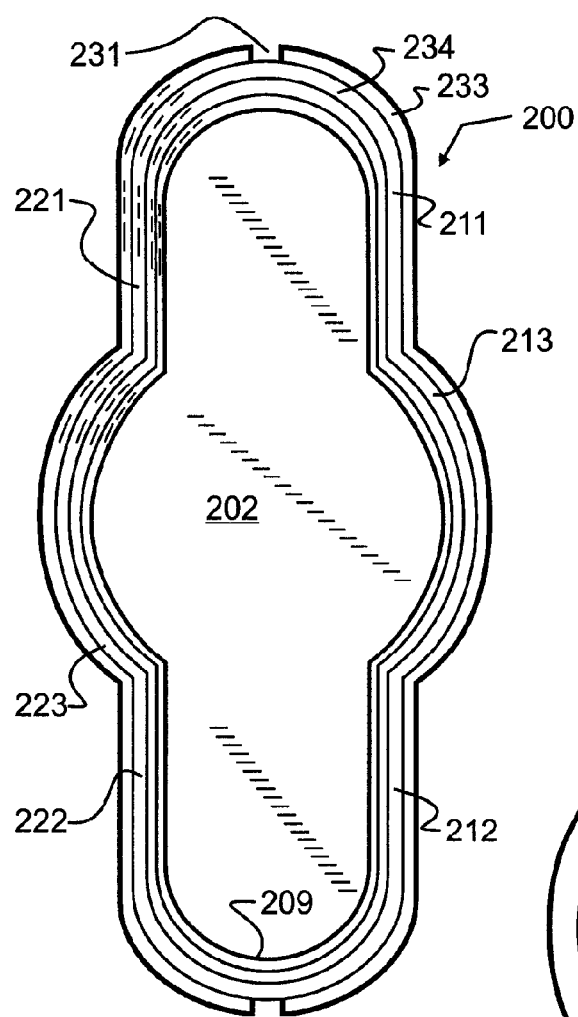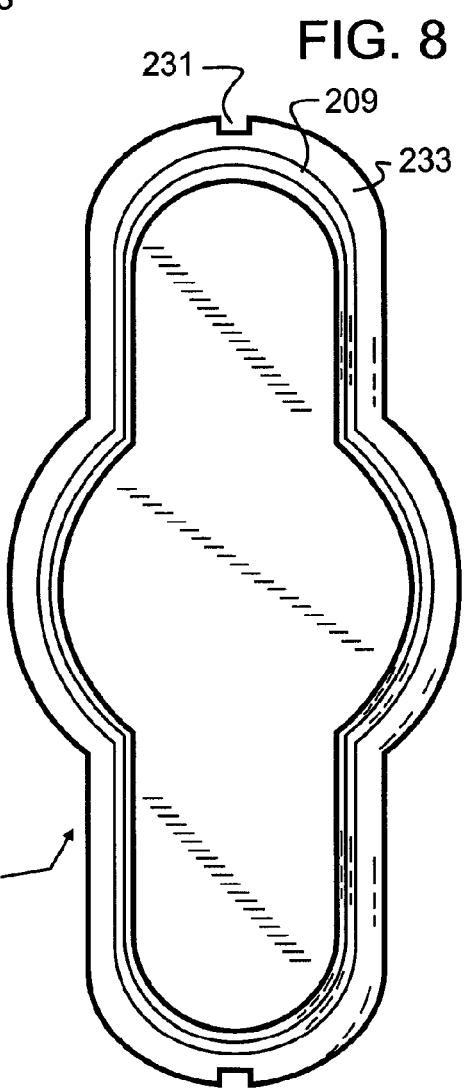
FIG. 7
FIG. 8

MELON CUTTING BOARDS

CROSS REFERENCE TO RELATED APPLICATIONS

This application claims the benefit of U.S. provisional patent application 61/508,476, filed Jul. 15, 2011, and the benefit of U.S. provisional patent application 61/645,039 filed May 9, 2012, each of the same title and inventorship, the entire contents of each which are incorporated herein by reference.

BACKGROUND OF THE INVENTION

1. Field of the Invention

This invention pertains generally to work holders, and more particularly to a work-underlying support well suited for the preparation, storage and serving of melons and other fruits and foods.

2. Description of the Related Art

Juicy and sweet melons and other similar fruits are highly coveted. There is little more thoroughly enjoyable than the taste of a cool melon on a hot summer day. Furthermore, research has demonstrated that there are many health benefits associated with consuming these fruits. Consequently, melons are in a very small group of foods that are both delectable and healthy. For the purposes of the present disclosure, melons will be understood to include but not be limited to cantaloupe, musk melons, honeydew melons, watermelons, and the many other known varieties of similar fruit. These melons are commonly quite large compared to other fruits, and are typically spherical or ovoid in shape.

Unfortunately, and in spite of the coveted taste and health benefits, many consumers are still reluctant to eat melons regularly. The high moisture and sugar content leads to significant juice release during and subsequent to cutting, peeling and other common preparatory activities. This juice can quickly create a sticky mess that can be quite difficult to clean. While a highly absorbent cleaner such as a high-quality paper towel will draw in the liquid, this tends to dehydrate the remaining juice, resulting in a significantly stickier surface. The paper towel will then tend to stick to the sticky surface and fall apart. Sponges and dish clothes dilute the juice, but do not remove it well. This means that multiple passes of wiping followed by rinsing are required to clean the surface when using a cloth or sponge. Particularly large melons may leak sufficient juice to not only wet a counter or cutting board, but may also leak onto the floor. All of the same issues with cleaning apply to cleaning the floor, but with the further issue that many kitchens are carpeted. Cleaning the juice from a carpet is extremely difficult.

In addition to the potential mess and difficulty cleaning up, the large size of most melons makes them difficult to handle. Their roundness, often spherical or ovoid, means they tend to roll on the counter or cutting board, further compounding the difficulty of handling them during preparation. The risk of the melon rolling, combined with the usually tough rind or peel, makes cutting them enough more dangerous to discourage some persons who would otherwise like to consume them. Even a careful and skilled cook may on occasion have a melon shift during cutting. If the melon rolls, the leaking juice may be pushed across the cutting board or counter and on to the floor.

Common cutting boards provide no solution to these problems of leaking juice and food sliding or rolling during cutting, instead only providing a protective barrier against damage due to the actions of the cutlery. Nevertheless, a number of artisans through time have recognized the desirability of a cutting board that captures and holds food in place. Exemplary patents, the contents and teachings which are incorporated herein by reference, include: U.S. Pat. No. 93,844 by Sykes, entitled "Carving dish"; U.S. Pat. No. 152,331 by Cass, entitled "Skewers"; U.S. Pat. No. 190,688 by Mathewson, entitled "Culinary dishes"; U.S. Pat. No. 345,528 by Mitchell, entitled "Carving device"; U.S. Pat. No. 361,742 by Bennett, entitled "Appliance for holding articles in position for carving meat, etc."; U.S. Pat. No. 566,479 by Sellman, entitled "Attachment for trays"; U.S. Pat. No. 943,767 by Bullard, entitled "Carving board"; U.S. Pat. No. 2,257,970 by Long, entitled "Tray for watermelons"; U.S. Pat. No. 2,464,114 by Bloecher, entitled "Meat holder to facilitate carving"; U.S. Pat. No. 2,599,681 by Wells, entitled "Carving board unit"; U.S. Pat. No. 2,620,003 by Perdue Jr, entitled "Base with meat carving facilities"; U.S. Pat. No. 2,751,951 by Strathaus, entitled "Roast board"; U.S. Pat. No. 2,942,639 by Margolis, entitled "Carving platter"; U.S. Pat. No. 3,030,994 by Wysowski, entitled "Meat carving board"; U.S. Pat. No. 3,995,844 by Hellman, entitled "Carving board"; U.S. Pat. No. 4,930,759 by Potter et al, entitled "Cutting board"; U.S. Pat. No. 5,580,037 by Gore, entitled "Food preparation and serving plate"; U.S. Pat. No. Des 162,101 by Wells, entitled "Carving board"; U.S. Pat. No. Des 167,750 by Karoff, entitled "Combined foldable roast board and food tray"; U.S. Pat. No. Des 168,098 by Klein, entitled "Meat carving board with hinged sections"; U.S. Pat. No. Des 168,304 by Klein, entitled "Meat carving board"; and U.S. Pat. No. Des 198,386 by Neuberg, entitled "Carving dish".

The aforementioned patents use spikes, impaling pins or small skewers that are designed to penetrate the flesh of meat or other foods. While such spikes, impaling pins or skewers are generally quite effective at holding a food during carving or cutting, they present several undesired deficiencies. Among these are: the inherent and undesired damage to the food, which can render the food unattractive or unsuitable for serving or presentation; an unattractive and even somewhat frightening appearance of the board itself with the plurality of spikes rising therefrom; the risk of accidental injury to a person or accidental damage to another object due to contact with the impaling pins, which can occur both during use and in cleaning or even when placing the board in storage or upon removal therefrom; and the specialized purpose of the device necessitated by the pins that interfere with other uses.

In addition, securely anchoring the pins is very important, since significant force may be required with tougher foods or rinds to drive them onto such pins. This has been achieved in several different ways in the prior art incorporated herein above. In some of these patents, the pins are formed integrally with the underlying cutting board. The pins must necessarily be of a generally hard material such as carbon steel or the like to maintain strength and the requisite sharp point, but such a hard material is very detrimental to a knife edge. Alternatively, artisans have anchored the hard pins into a more suitable and softer material, or provided a framework to support the pins. Unfortunately, secure anchoring is difficult. This embedding or supporting framework may work for a limited period, but over time the forces applied against the pins will tend to deform the surrounding softer cutting board material, leading to loose and wobbly pins that become progressively more useless. In addition, and long before the pins are visibly loose, there will be microcracks between the pins and the board, leading to the undesirable entrapment of juices.

Seeking to improve upon the limitations of the prior art impaling pins, U.S. Pat. No. 5,527,022 by Gibson, entitled "Cutting board", the contents and teachings which are incorporated herein by reference, illustrates a cutting surface covered by small conical protrusions that are designed to grip the food, without impaling. In addition, a juice channel is provided for collection and drainage. Unfortunately, these small conical protrusions, while presenting more friction than a plain and smooth cutting board, provide insufficient engagement with large melons to effectively prevent slipping, and do not prevent melons from rolling during cutting. Further, these protrusions are easily damaged during contact with cutlery, rendering them progressively less effective over time.

In U.S. Pat. No. 4,989,846 by Quinn, entitled "Covered dish carrier", the contents and teachings which are incorporated herein by reference, a cutting board is provided with holes that only partially extend through the cutting board. Into these holes pins may be placed that can be used to capture a food for cutting, or alternatively to hold and retain a dish thereupon. When the pins are not desired, they may be removed and the cutting board used in the traditional manner. Since these pins are designed only to form a perimeter around the food or container, they do not penetrate the food. As a result, the food is still preserved for presentation, and not punctured or damaged in any way. Undesirably, these removable pins must be kept with the cutting board or they will be readily lost. Further, the partial holes present surfaces at the bottom of the hole that are difficult to completely clean and sanitize. Finally, the size of the pins needed to capture and hold a food or receptacle will vary depending upon the size of the food or receptacle, meaning a large assortment of pins may be necessary.

Seeking to improve the utility of an ordinary cutting board, several artisans have combined a cutting board together with a juice collecting tray or receptacle. These again provide no way to secure a melon or other food against slipping and rolling. Exemplary patents, the contents and teachings which are incorporated herein by reference, include: U.S. Pat. No. 5,366,208 by Benjamin, entitled "Cutting board receptacle tray"; U.S. Pat. No. Des 161,596 by Russ, entitled "Combined food receptacle and chopping board"; and U.S. Pat. No. Des 281,850 by Morin, entitled "Combined drawer and chopping board therefor".

In U.S. Pat. No. 7,134,653 by Ladenheim, entitled "Portable reversible cutting board having removable cover and tool", the contents and teachings which are incorporated herein by reference, a cover is provided that couples with a cutting board to allow the combination to be used not only for cutting, but also for serving. Unfortunately, the cutting board lacks any features to prevent the food from slipping or rolling during cutting, and has only a small, nominal trough to retain juices and hold them during transport or serving.

Two U.S. patents, U.S. Pat. No. 4,140,340 by Cloutier, entitled "Watermelon tray" and U.S. Pat. No. 6,206,356 by Beloff, entitled "Tray for holding food", the contents and teachings which are incorporated herein by reference, illustrate melon supports that can securely hold melons of diverse size against slipping or rolling during cutting without impaling, and which simultaneously capture any juices released therefrom. These patents illustrate uniquely sloped ribs that run transverse to the longitudinal axis of the melon and cradle the melon, while allowing access between the ribs for transverse cutting. Under the ribs, there is a region which receives and retains liquids that may drain from the supported food. While these patents illustrate very effective melon holders, they are again very restricted in use, since the ribs will interfere with the cutting of many other foods, and, without proper care, will also interfere during the cutting of a melon. Given the limited kitchen storage space available in a typical kitchen, the significant size board required for cutting melons, and the need to properly guide the knife through the melon to avoid the ribs, these melon cutting boards are not practical for most consumers.

Other less relevant patents, the contents and teachings which are incorporated herein by reference, include: U.S. Pat. No. 1,962,799 by Whitmarsh, entitled "Cattle-skinning cradle"; U.S. Pat. No. 2,104,278 by Schultz entitled "Bread slicer guide"; U.S. Pat. No. 2,147,800 by Sadowski, entitled "Work holder"; U.S. Pat. No. 2,536,268 by Dillon, entitled "Adjustable slaughtering cradle"; U.S. Pat. No. 4,684,113 by Douglas et al, entitled "Universal holding fixture"; U.S. Pat. No. 5,598,759 by Sie et al, entitled "Food slicing rack devices"; and U.S. Pat. No. 5,907,989 by Sie et al, entitled "Food slicing rack devices".

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a support well suited for the preparation, storage and serving of melons and other fruits and foods. The support has a base operatively contacting a countertop or the like, a first generally linear food contacting support member, a second generally linear food contacting support member coaxial with the first generally linear food contacting support member, and a first arcuate food contacting support member interspersed between the first generally linear food contacting support member and the second generally linear food contacting support member and defining a first portion of a circle circumference. A third generally linear food contacting support member is parallel to but displaced from the first generally linear food contacting support member. A fourth generally linear food contacting support member is coaxial with the third generally linear food contacting support member. A second arcuate food contacting support member is interspersed between the third generally linear food contacting support member and the fourth generally linear food contacting support member and defines a second portion of the circle circumference. At least one spacer elevates the first generally linear food contacting support member, second generally linear food contacting support member, third generally linear food contacting support member, fourth generally linear food contacting support member, first arcuate food contacting support member, and second arcuate food contacting support member above the base.

In a second manifestation, the invention is a carving support facilitating cutting, preparation, storage and serving of melons and other fruits and foods. The carving support has a base, a pair of spaced, generally parallel and generally linear food contacting support surfaces that together define a first plane of elevation, a pair of spaced, generally arcuate food contacting support surfaces that each define separate and distinct portions of a common circle circumference co-planar with the first plane of elevation; and a spacer elevating the pair of spaced, generally parallel and generally linear food contacting support surfaces and pair of spaced, generally arcuate food contacting support surfaces above the base.

OBJECTS OF THE INVENTION

Exemplary embodiments of the present invention solve inadequacies of the prior art by providing a generally square base serving tray subdivided generally diagonally into three sections by partial-height walls and having partial-height support pads at opposite ends of the diagonal perpendicular to the sections, and an irregular oval or boat-shaped cutting and serving tray configured to nestle to the bottom of and within a center diagonal section of the base serving tray or alternatively rest elevated above the partial-height walls between a pair of partial-height support pads. The base serving tray and the nestled cutting tray each have lids permitting food to be stored therein. The nestled cutting tray lid is further designed to serve as an alternative flat cutting board with a juice groove defined by the lid closure lip. The unique geometry of the upper rim of the cutting tray accommodates melons of various sizes, and secures them against sliding or rolling during cutting.

A first object of the invention is to support spherical or ovoid foods including but not limited to melons upon an elevated support that contains and restrains the food against slipping, sliding or rolling upon the support. A second object of the invention is to contain juice released during and subsequent to cutting and other preparatory steps, such that the juice can be collected and used, or alternatively disposed of, without interfering with the cutting and other preparations. Another object of the present invention is to accommodate very diverse food sizes and geometries, while assisting with accuracy and uniformity of cuts. A further object of the invention is to provide drainage channels that are below a support surface to separate the food from the juice, thereby isolating and containing the juice even if the food should somehow move or roll. Yet another object of the present invention is to provide a variety of cutting surfaces to facilitate a variety of cutting chores and techniques, while preserving the fluid isolation and collection. A further object of the invention is to provide a variety of containers to facilitate diverse food preparation, delivery and storage. Another object of the present invention is to enable compact and efficient storage of the variety of containers and cutting surfaces. A further object of the invention is to be intuitive to use. An additional object of the present invention is for the supports to be non-damaging to the food supported and held thereon. A further object of the invention is to be compatible with and avoiding dulling of cutlery. An even further object of the invention is to be easily cleaned, with no sharp or dangerous pins or cracks or crevices that might otherwise unsanitarily trap and retain juices.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 7 illustrates the preferred embodiment cutting tray of FIG. 6 from a top plan view.

FIG. 8 illustrates the preferred embodiment cutting tray of FIG. 6 from a bottom plan view.

DESCRIPTION OF THE PREFERRED EMBODIMENT

Manifested in the preferred and alternative embodiments, the present invention provides a holder of unique geometry which supports a variety of diverse melons and other foods during cutting and other preparation. In addition, the preferred embodiment further provides a variety of additional optional cutting surfaces, and simultaneously provides a variety of serving and storage receptacles.

Figure 1:
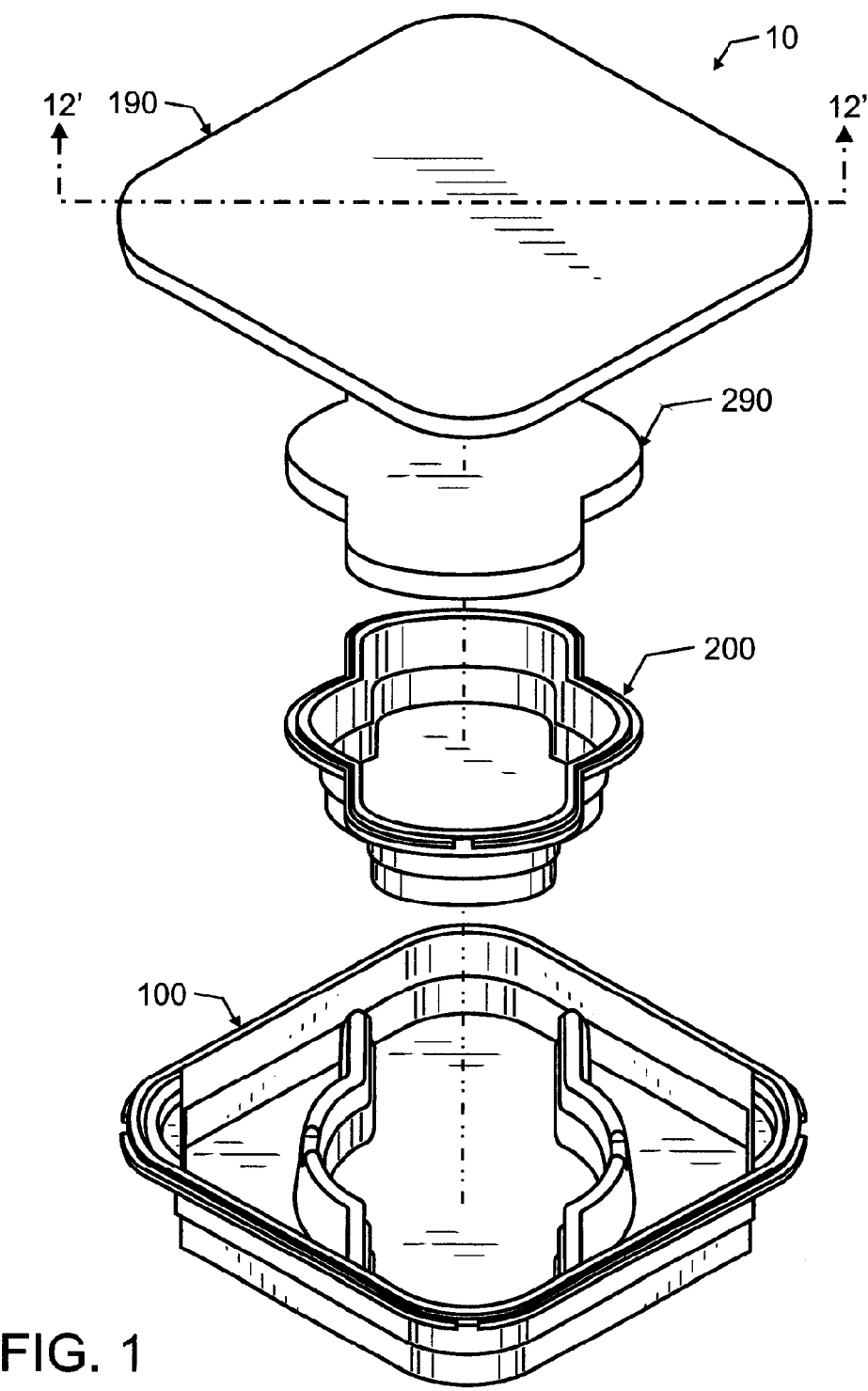
FIG. 1 illustrates a preferred embodiment nestled melon cutting and serving combination designed in accord with the teachings of the present invention by projected, exploded view.
Figure 5:
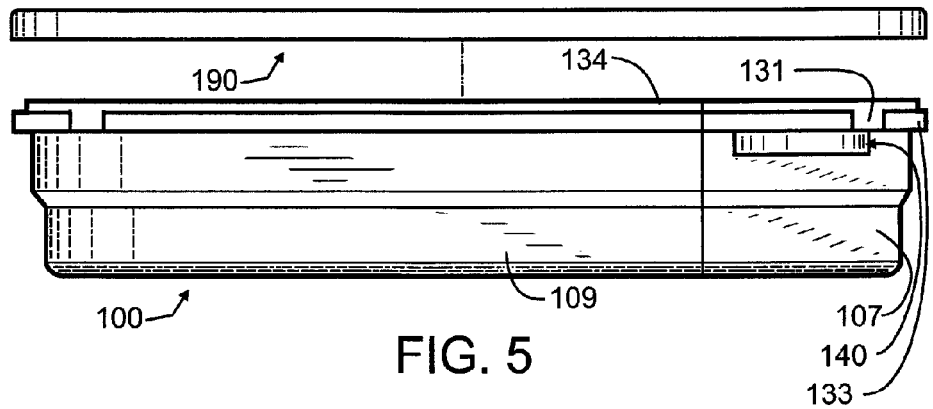
FIG. 5 illustrates the preferred embodiment base serving tray of FIG. 2 from a front elevational view, with the back elevational view being identical thereto, and the left and right side views being mirror images.
Figure 2:
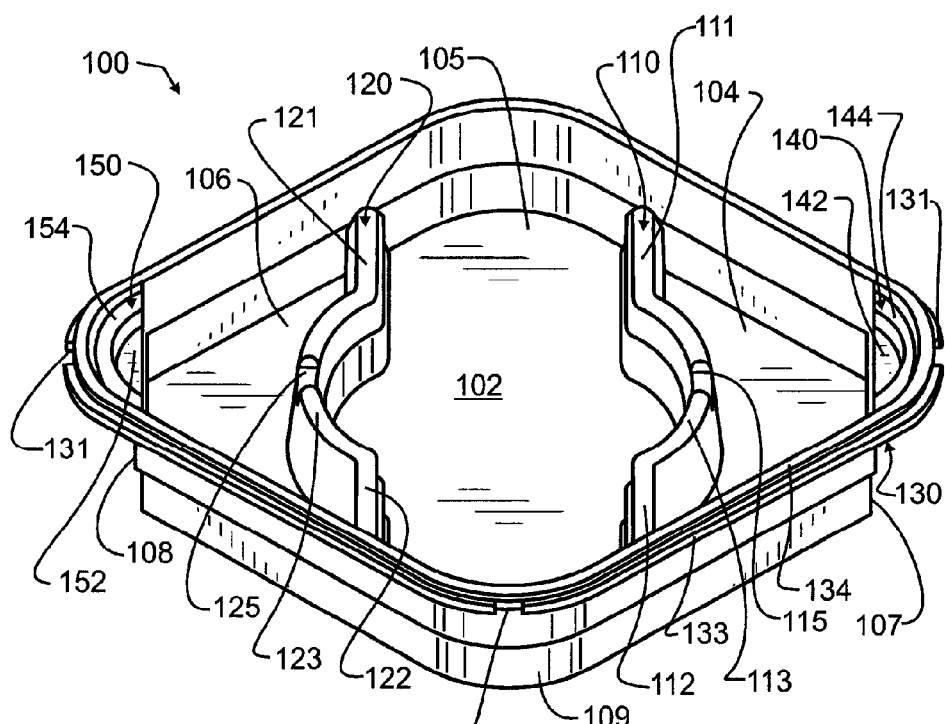
FIG. 2 illustrates a preferred embodiment base serving tray as used in the combination of FIG. 1 from a projected view.
Figure 3:
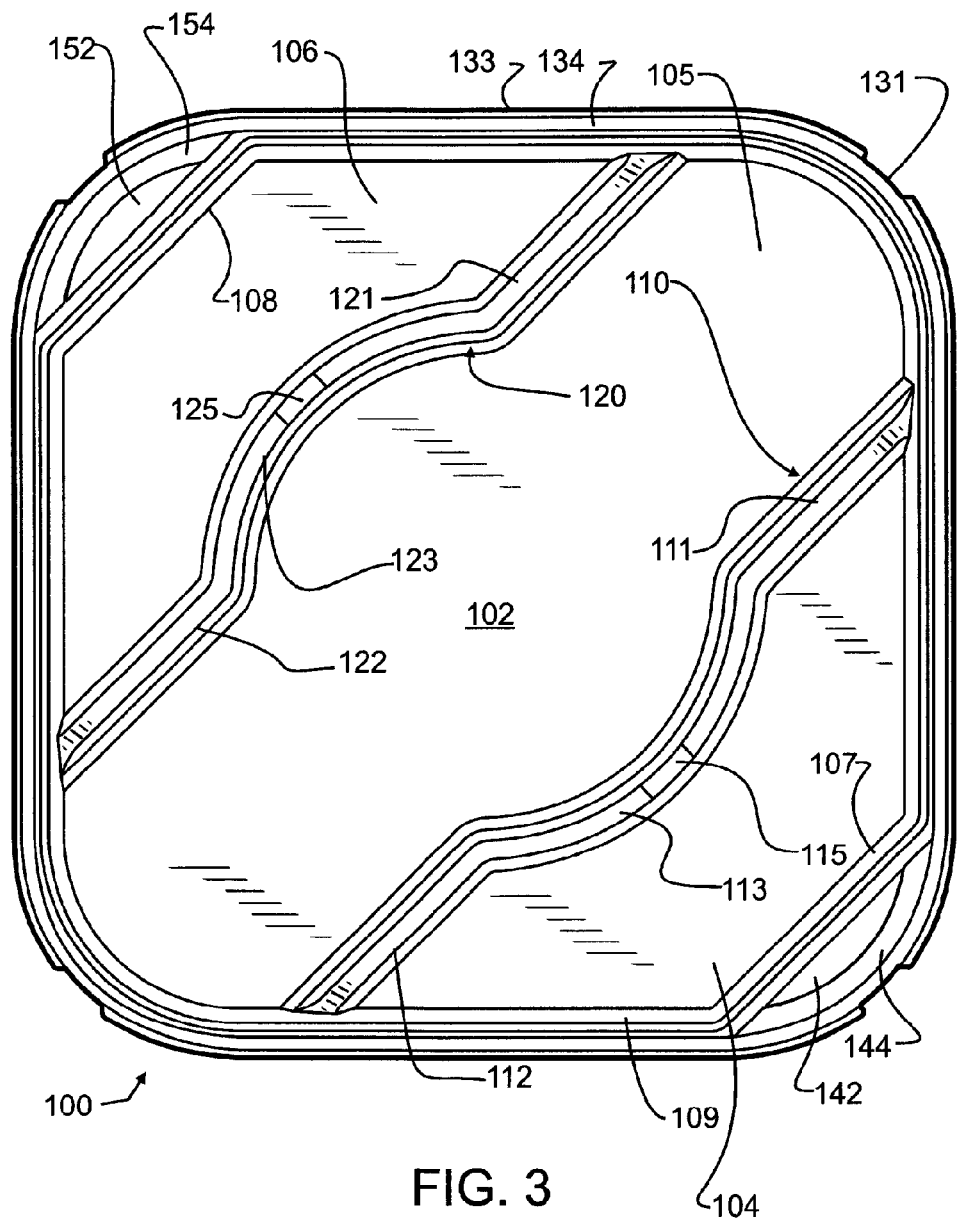
FIG. 3 illustrates the preferred embodiment base serving tray of FIG. 2 from a top plan view.
Figure 4:
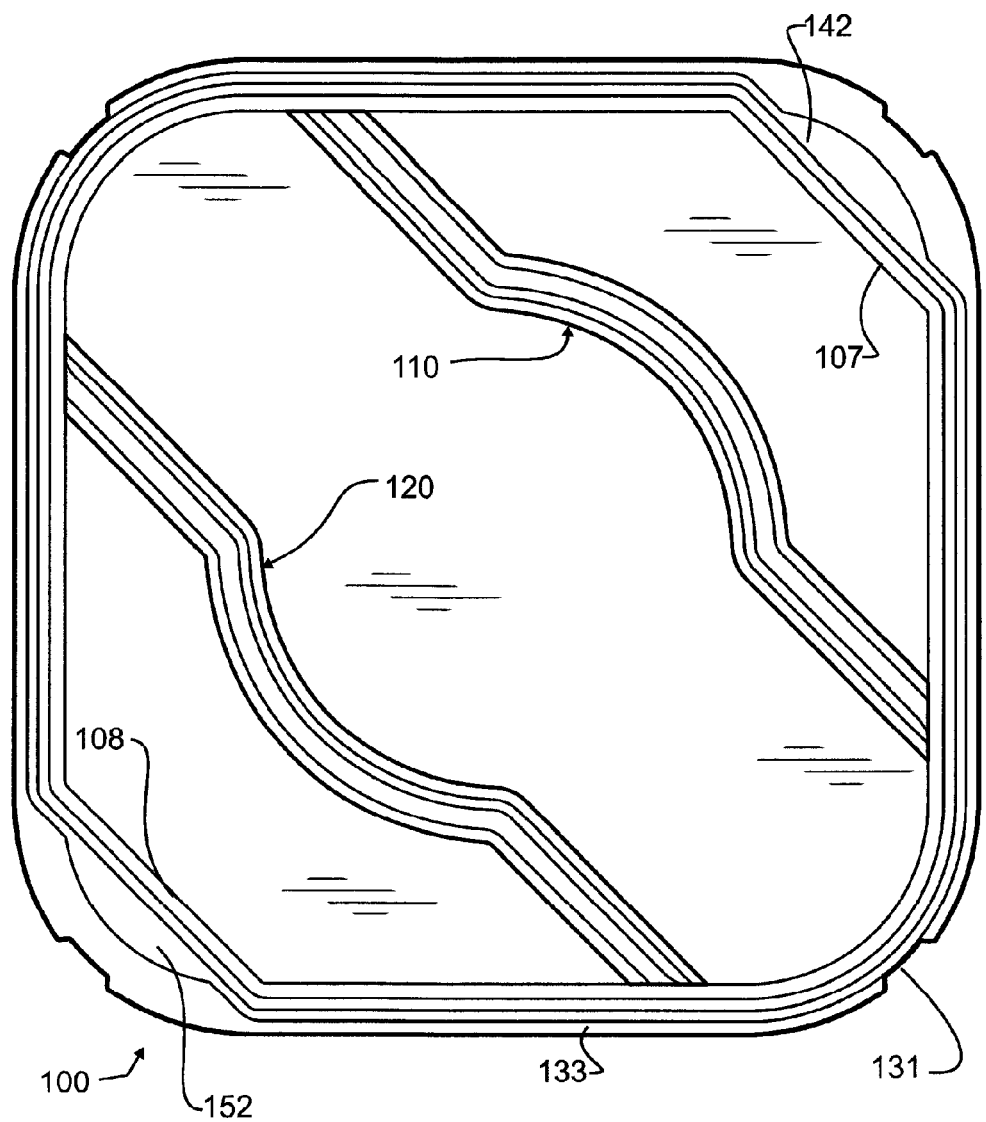
FIG. 4 illustrates the preferred embodiment base serving tray of FIG. 2 from a bottom plan view.
Figure 6:
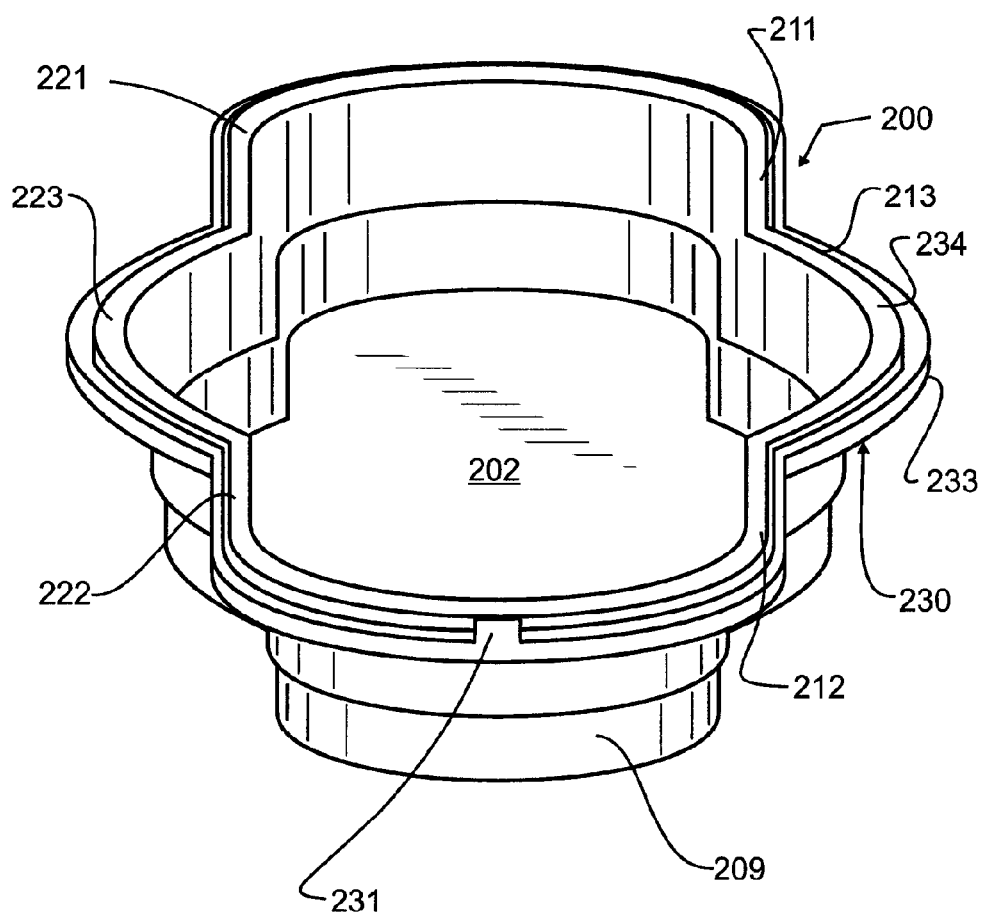
FIG. 6 illustrates a preferred embodiment nestled melon cutting and serving tray as used in the combination of FIG. 1 from a projected view.
Figure 9:
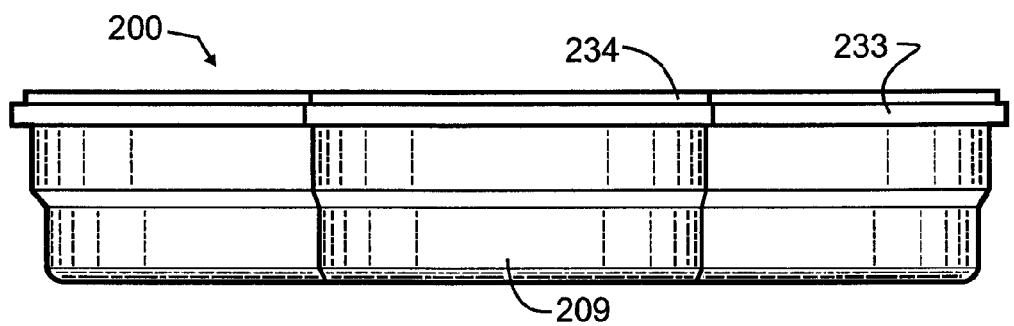
FIG. 9 illustrates the preferred embodiment cutting tray of FIG. 6 from a right side elevational view, with the left side elevational view being identical thereto.
Figure 10:
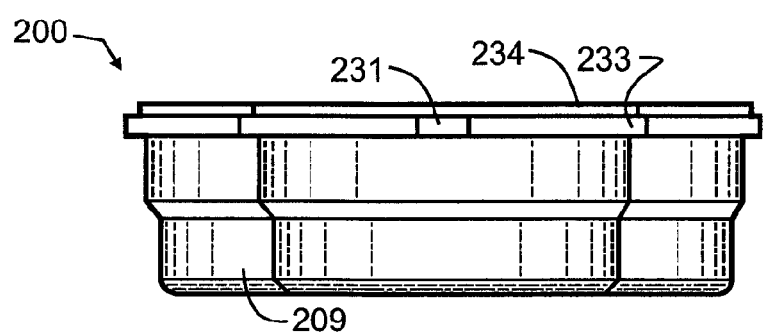
FIG. 10 illustrates the preferred embodiment cutting tray of FIG. 6 from a front elevational view, with the back elevational view being identical thereto.

In a first preferred embodiment of the invention illustrated in FIGS. 1-14, and with particular reference to FIG. 1, a preferred embodiment nestled melon cutting and serving combination 10 has a melon cutting board and serving tray 100, a serving tray cover 190, and nested therein a second serving tray and melon cutting board 200 and cutting board cover 290. Consequently, there are two fully separate but nestable containers, each having separate covers, for cutting and serving melons and other foods.

Melon cutting board and serving tray 100 is suitable for serving one or a variety of foods or fruits in the three separate sections 104, 105, 106 formed therein. These sections are defined by generally vertical side walls 107-109, base 102, and section dividers 110, 120. When combined with cover 190, tray 100 may further be used for storage and transport as well. The unique geometry of section dividers 110, 120 permit tray 100 to additionally be used to support melons during cutting. The melon will be placed to span between section dividers 110 and 120. Exact placement will be determined by an individual at the time of use, and will normally depend almost entirely upon the size and geometry of the melon and the preference of the individual. For exemplary purposes, and not solely limiting thereto, a small generally spherical melon such as a cantaloupe will be placed to rest upon and span the top arcs 113 and 123. Practically independent of melon diameter, the melon will naturally drop between these arcs 113, 123 and hang down towards bottom 102. A smaller diameter spherical melon may drop more closely adjacent to bottom 102, while a large diameter spherical melon will barely drop below the tops of arcs 113, 123. However, preferably all melons for which this board is designed will remain elevated above base 102 when cradled within arcs 113, 123. Doing so allows any juice to drain into and be collected within section 105, isolated from the melon rind.

When the melon is generally spherical, the orientation of the cutting board relative to the direction of a knife or other cutlery is not critical. In other words, a person may cut the melon at any angle relative to dividers 110, 120, and the arcs 113, 123 will retain the melon securely therein.

Not all melons, or other fruits or foods, are spherical. Many melons are ovoid, meaning egg-shaped, while other fruits such as pineapples tend to be generally cylindrical. Ovoid foods will typically be captured within arcs 113, 123 in the same manner as spherical foods. A person may elect to place the food at some other location, such as between linear segments 111 and 121, but if so placed, the person will preferably cut transversely to these linear segments. Cutting parallel to linear segments 111, 121, particularly with a spherical food supported therebetween, can undesirably result in the food rolling or sliding similar to prior art flat cutting boards.

For those more cylindrical melons or fruits, the generally linear segments 111 and 112, and the spaced from but generally parallel and generally linear segments 121, 122 can support and hold the melon, fruit or food. Once again, it is preferable that the food remains elevated above bottom 102 when cradled therein. While it is contemplated herein that only one set of linear segments, such as 111, 121 be provided, the provision of two sets of linear segments is preferred, since this centers arcs 113, 123, better accommodating ovoid fruits and other foods.

Section 104 is defined by generally vertical walls 107, 109 and partial height section divider 110. Section 106 is defined by generally vertical walls 108, 109 and partial height section divider 120. During the cutting of a melon or other food, sections 104, 106 may be used to catch and contain either cut food or food waste, such as rind, peelings and the like. Once cutting is completed, sections 104, 106 will normally act as storage and serving receptacles, and may contain not only the cut foods such as melons, but may alternatively contain other foods such as chip or vegetable dip, chips or vegetables, and any other food. Once cutting is completed, section 105 which is defined by generally vertical wall 109 and partial height section dividers 110, 120 may also be used as a serving and storage receptacle.

Cover 190 will preferably snap onto and about cover ring 134, and either or both cover 190 and cover ring 134 may be provided with any suitable geometries as is known in the art of receptacles and covers to ensure a snug but releasable fit therebetween. A lip 133 may preferably be provided which helps to prevent accidental separation between cover 190 and cover ring 134, by preventing objects adjacent to melon cutting board and serving tray 100 from directly contacting cover 190. One or more small notches 131 are preferably formed in lip 133, such as at each diagonal corner as illustrated in the figures, which permits a person to easily manually access cover 190 when a person desires to remove cover 190 from melon cutting board and serving tray 100.

Owing to the unique geometry of melon cutting board and serving tray 100, a second serving tray and melon cutting board 200 and cutting board cover 290 may nest within melon cutting board and serving tray 100. These two embodiments of melon cutting board and serving trays 100, 200 designed in accord with the present invention have been illustrated in the various figures. The embodiments are distinguished by the hundreds digit, and various components within each embodiment designated by the ones and tens digits. However, many of the components are alike or similar in structure and function between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one of melon cutting board and serving trays 100, 200 to the other in accord with the present teachings, except where such substitution would otherwise destroy operation of the embodiment. Consequently, those skilled in the art will readily determine the function and operation of many of the components illustrated herein without unnecessary additional description.

The noteworthy distinctions between melon cutting board and serving trays 100, 200 is that melon cutting board and serving tray 200 is a single section, so vertical wall 209 which forms the entire vertical exterior extends the full height of melon cutting board and serving tray 200. In contrast, section dividers 110, 120 are only partial height, shorter than the surrounding walls 107-109. This means that, when a melon is to be cut and can be accommodated within melon cutting board and serving tray 200, the knife may be used to cut down to adjacent with cover ring 234, where with melon cutting board and serving tray 100, the knife would undesirably contact cover ring 134 well before reaching section dividers 110, 120. Consequently, depending upon the preferences of the user, melons and other foods may be cut using melon cutting board and serving tray 200 by removing melon cutting board and serving tray 200 from melon cutting board and serving tray 100. Generally linear segments 211, 212, 221, 222 function in the same manner and purpose as segments 111, 112, 121, 122 described herein above.

Figure 11:
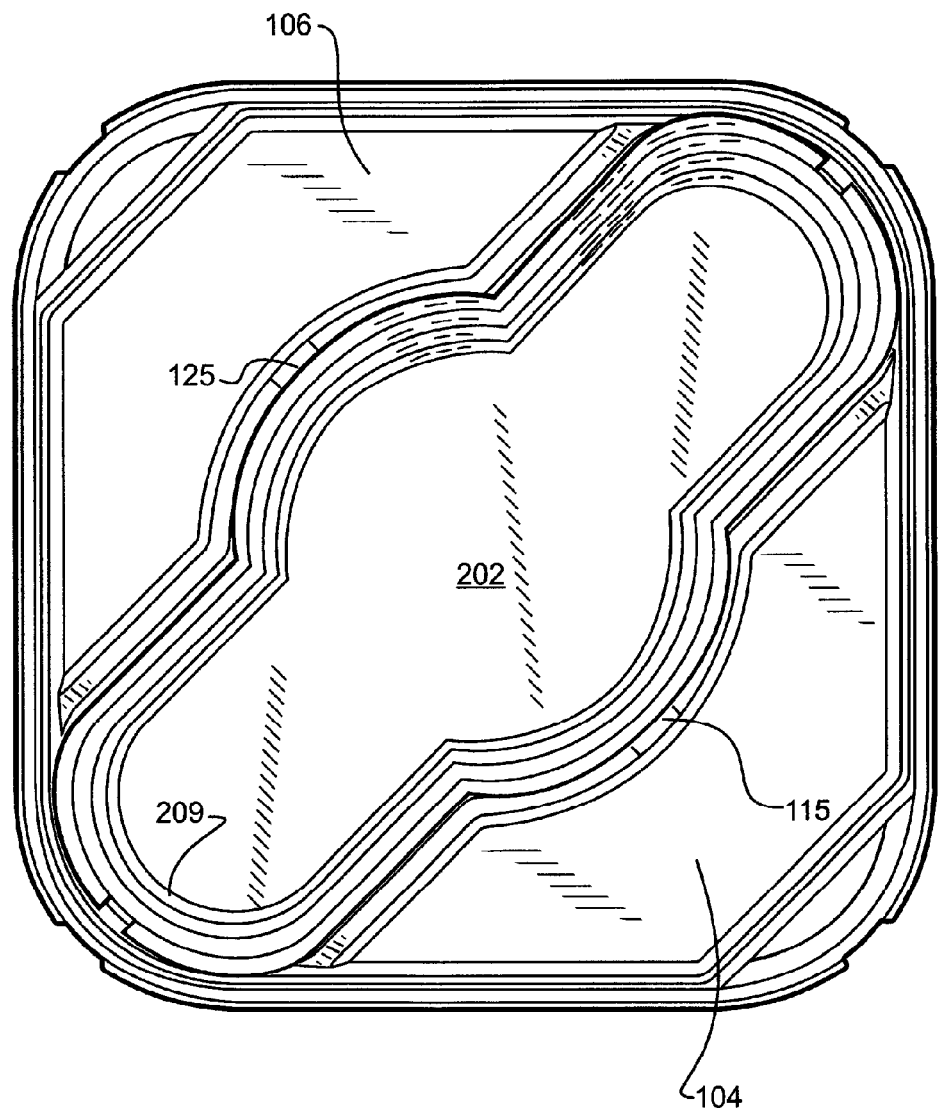
FIG. 11 illustrates the preferred embodiment nestled melon cutting and serving trays as used in the combination of FIG. 1 from a top plan view, with the associated covers removed therefrom.

As apparent from FIGS. 1 and 11, melon cutting board and serving trays 100, 200 are nestable. Notches 115, 125 are provided in section dividers 110, 120 to enable a person to readily grasp lip 233 to lift and remove melon cutting board and serving tray 200 from melon cutting board and serving tray 100. Doing so, as already described herein above, allows melon cutting board and serving tray 200 to be used completely independently from melon cutting board and serving tray 100.

Figure 12:
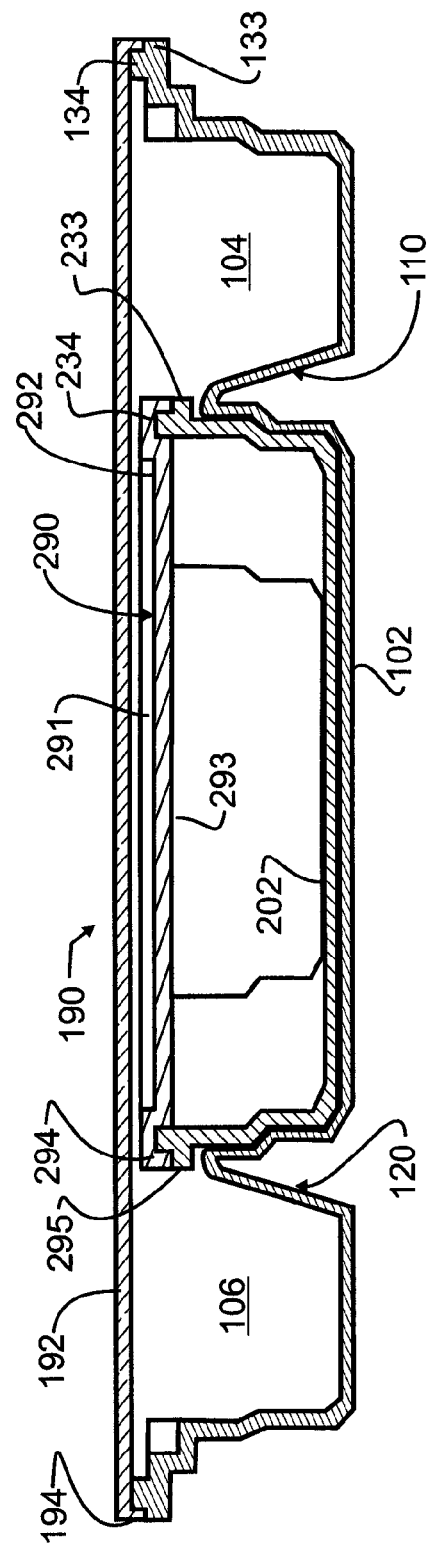
FIG. 12 illustrates the preferred embodiment nestled melon cutting and serving combination of FIG. 1 by side sectional view taken along section line 12' of FIG. 1.

FIG. 12 illustrates melon cutting board and serving trays 100, 200 nested together, with covers 190, 290 in place, by cross-section view as taken along section line 12' of FIG. 1. This allows for efficient storage of nestled melon cutting and serving combination 10 when not in use, and when in use permits diverse foods to be kept in the refrigerator or otherwise stored. Also visible in FIG. 12 is the unique geometry of lid 290, which has a top surface 292, a bottom surface 293, and a u-shaped closure lip 294 that terminates at a surface 295 that is parallel and preferably co-planar with bottom surface 293. With this preferred geometry, lid bottom surface 293 may serve as an alternative cutting board. The u-shaped geometry of closure lip 294 defines a drainage channel which captures small quantities of juice, helping to keep a counter or other work surface clean and dry.

Figure 13:
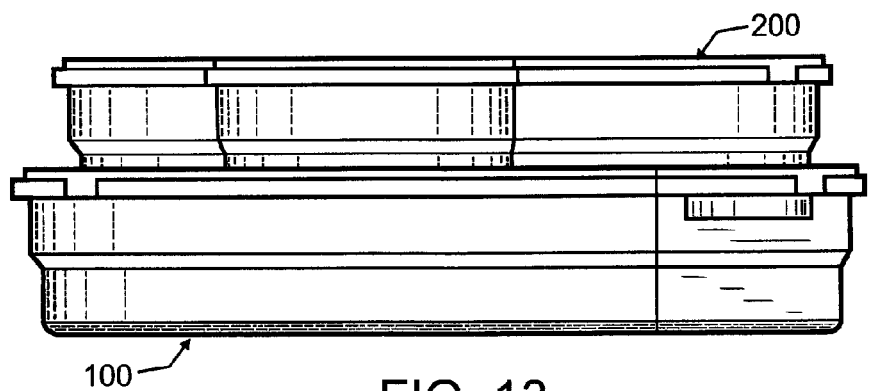
FIGS. 13 and 14 illustrate the preferred embodiment melon cutting and serving trays as used in the combination of FIG. 1 from a side elevational view and a top plan view, respectively, with the associated covers removed therefrom, and in an alternative configuration with the cutting tray rotated ninety degrees with respect to the serving tray and partially elevated therefrom.
Figure 14:
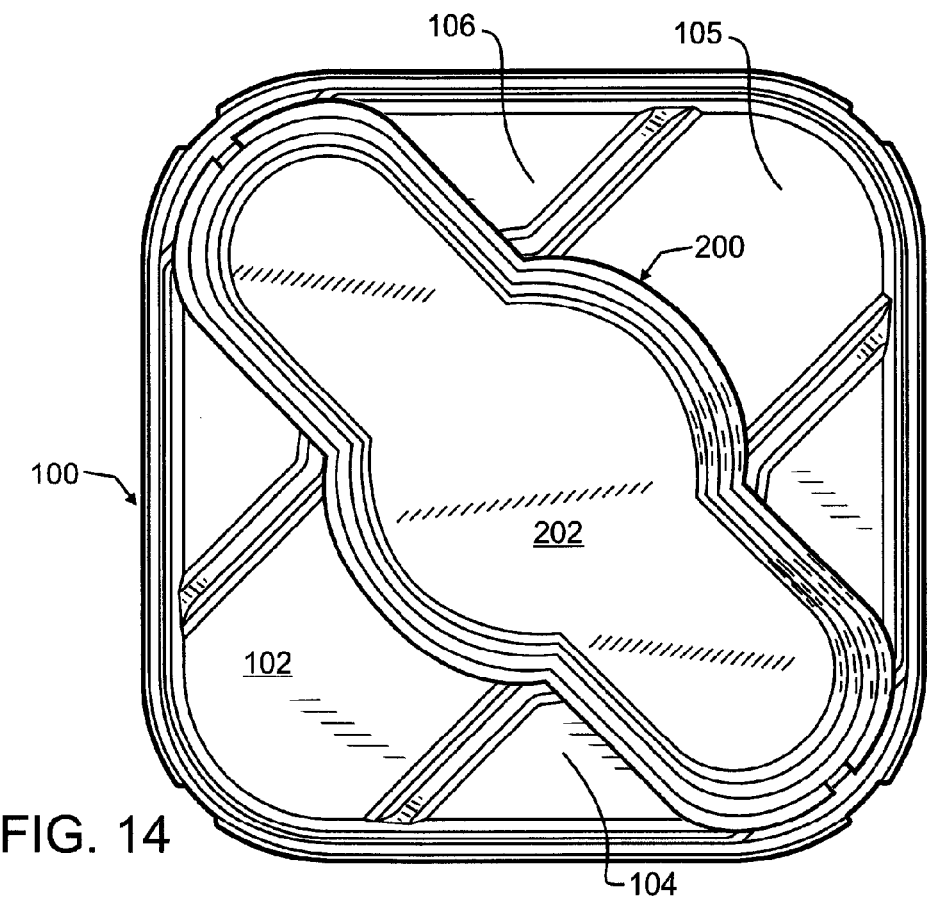

FIGS. 13 and 14 illustrate nestled melon cutting and serving combination 10 in an alternative configuration, with melon cutting board and serving tray 200 rotated 90 degrees relative to that of FIG. 11. This arrangement aligns base 202 with special supporting pads 142, 152 and shoulders 144, 154 that secure the distal longitudinal ends of melon cutting board and serving tray 200. When so arranged, and as best illustrated in FIG. 13, melon cutting board and serving tray 200 is supported within but elevated above melon cutting board and serving tray 100, which can further facilitate cutting or other food preparation.

As may be apparent, this preferred embodiment melon cutting and serving combination 10 comprises a highly adaptable construction to suit a wide variety of needs, permitting compact storage when not in use, isolation of a variety of foods for serving and refrigeration or freezing or other storage when in use, and also providing a number of easy-to-use cutting surfaces for melons and other foods of diverse sizes while collecting and retaining juices that leak therefrom during the cutting. By using the appropriately sized cutting support, a person may gather the juices and still isolate the juices from direct contact with the rind, since the melon may preferably be supported above where the juices are collected. The base 102, 202 may rest upon a countertop, within a sink, or in any other suitable location. While not the most preferred use, either of the bases 102, 202 may additionally form yet another cutting surface by inverting the entire associated melon cutting board and serving tray 100, 200.

Melon cutting and serving combination 10 is preferably fabricated from a material suitable for use as a cutting board. In use, a melon or other food which is desired to be cut or severed is operatively placed upon any one of the suitable cutting supports and then cut into one or a plurality of sections. When cutting is completed, the members are easily separated from each other, cleaned, and very compactly stored.

Figure 15:
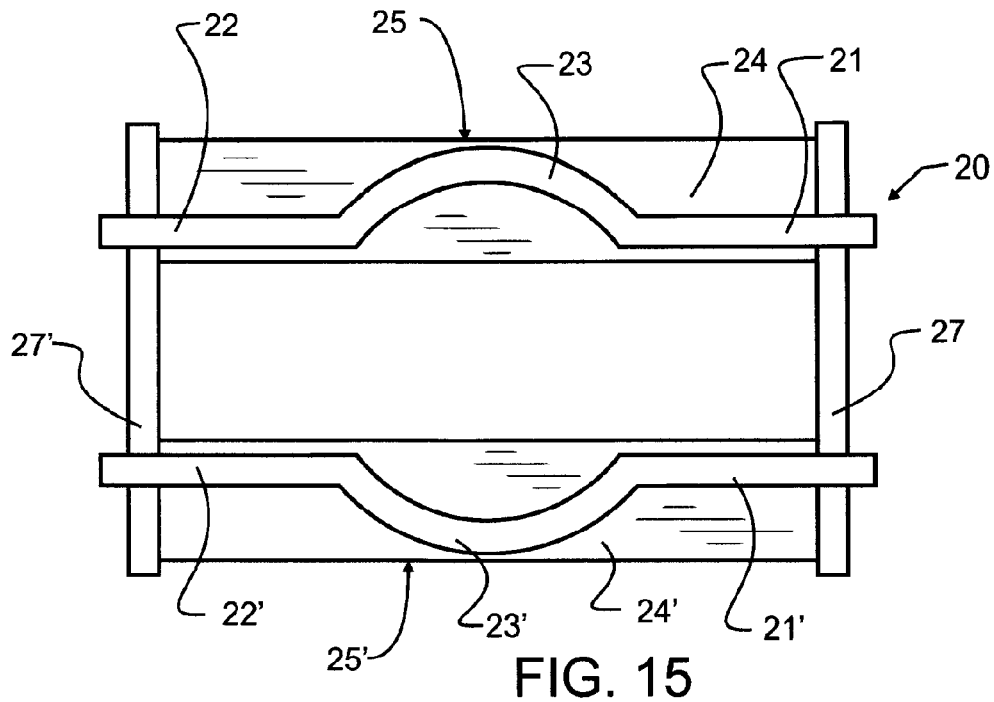
FIG. 15 illustrates an alternative embodiment melon cutting board designed in accord with the teachings of the present invention by top plan view.
Figure 16:
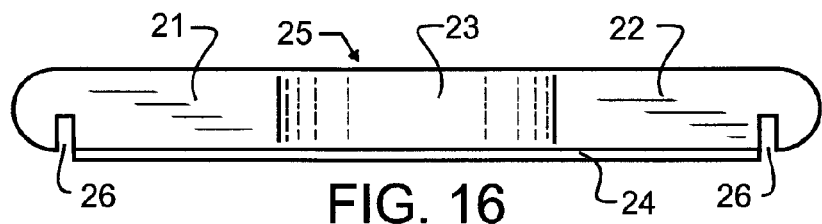
FIG. 16 illustrates a preferred melon support member as used in the alternative embodiment melon cutting board of FIG. 15 from a back side elevational view.
Figure 17:
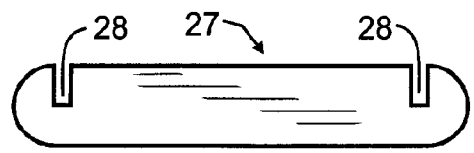
FIG. 17 illustrates a preferred spacer member as used in the alternative embodiment melon cutting board of FIG. 15 from a left side elevational view.

FIGS. 15-17 illustrate a first alternative embodiment melon cutting board 20. Cutting board 20 is preferably fabricated from four discrete members 25, 25', 27, and 27', each which is fully or primarily separable from the others. In this way, melon cutting board 20 may be disassembled into four individual components for easy cleaning, storage, and light weight transport to a picnic or camping site.

Each of the four discrete members 25, 25', 27, and 27' are provided with notches 26, 28 at distal ends, resembling those used to construct a log house, and each component then can slide into a notch in an adjacent member during assembly, prior to use. However, any suitable means may be used to couple the members together, including other geometric engagements, various fasteners and adhesives. While such coupling is preferably separable and temporary, permanent couplings may also be provided.

To provide a stable base, members 25, 25' are provided with a base 24, 24' respectively that provides an enlarged area of contact with a sink, countertop, the ground, or any other suitable surface.

Melon cutting board 20 also illustrates the addition of an enlarged gap defined by arcs 23, 23' in the central portion of the two longer members. This generally circular portion or shape is most preferably designed to cradle smaller melons such as cantaloupe and honeydew melons. Larger or more oval or oblong food items are supported throughout a larger portion of the two longer members, but a smaller or more round food item will rest within the center circular portions of the two longer members. This combination of generally linear segments 21, 22 with arc 23, and the corresponding generally linear segments 21', 22' with arc 23' work in the same manner and may be used in the same way as those identified herein above as 111, 112, 113, 121, 122, 123 and 211, 212, 213, 221, 222, 223. However, owing to the separable nature of the four discrete members 25, 25', 27, and 27', this alternative embodiment melon cutting board 20 may be readily disassembled into more compact storage.

From the foregoing figures and description, several additional features and options may become more apparent. The melon or food contacting surfaces defined by generally linear segments 21, 22, 21', 22', 111, 112, 121, 122, 211, 212, 221, 222, and arcs 23, 23', 113, 123, 213, 223 are preferably relatively co-planar with their associated counterparts. While in the preferred embodiments these components are spaced from the associated bases by generally vertical side walls, other spacers may be incorporated, such as posts or the like. In an extreme example contemplated herein, the food contacting surfaces might comprise a portion of a wire frame, such that the vertical spacers and base are also a part of the wire frame. Nevertheless, the vertical side walls of the preferred embodiment provide the further combination of closed containers and receptacles, a feature which is unavailable in the alternative embodiment melon cutting board 20 and would likewise be unavailable in a wire frame version thereof.

A preferred embodiment melon cutting board may be manufactured from a variety of materials, including metals, resins and plastics, ceramics or cementitious materials, or even combinations or composites of the above. The specific material used may vary, though special benefits are attainable if several important factors are taken into consideration. First, it is preferable that all materials are sufficiently tough and durable to not fracture, even when great forces are applied thereto. Stain resistance, food compatibility and similar characteristics are also desirable. A material soft enough to not dull cutlery is also preferable. A preferred material may comprise polyethylene in any suitable molecular weight. Polyethylene has the advantage of being stain and chemical resistant, tough and durable, scuff resistant, is readily cleaned, and easily manufactured as desired. Nevertheless, there are a plethora of suitable materials available. Furthermore, the materials selected may vary depending upon a particular manufacturing method chosen. Various fillers, additives or other ingredients may be combined with the selected material to improve or enhance particular properties, or may be selectively added or applied as coatings.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. A support well suited for the preparation, storage and serving of melons and other fruits and foods, comprising:
   a base;
   a first generally linear food contacting support member defining a first longitudinal axis and extending in and thereby at least partially defining a cutting support plane generally parallel to and spaced from base, and having a first terminus in said cutting support plane and a second terminus in said cutting support plane distal therefrom;
   a second generally linear food contacting support member defining a longitudinal axis coaxial with said first generally linear food contacting support member first longitudinal axis and extending in said cutting support plane and thereby at least partially defining said cutting support plane, and having a first terminus in said cutting support plane and a second terminus in said cutting support plane distal therefrom;

a first arcuate food contacting support member interspersed between said first generally linear food contacting support member and said second generally linear food contacting support member and defining a first portion of a circle circumference extending in said cutting support plane and thereby at least partially defining said cutting support plane, and having a first terminus originating adjacent to said first generally linear food contacting support member second terminus, and having a second terminus adjacent to said second generally linear food contacting support member second terminus;

a third generally linear food contacting support member defining a second longitudinal axis parallel to but displaced from said first generally linear food contacting support member first longitudinal axis by a first spacing distance there between, said third generally linear food contacting support member extending in said cutting support plane and thereby at least partially defining said cutting support plane, and having a first terminus in said cutting support plane and a second terminus in said cutting support plane distal therefrom;

a fourth generally linear food contacting support member coaxial with said third generally linear food contacting support member second longitudinal axis and extending in said cutting support plane and thereby at least partially defining said cutting support plane, and having a first terminus in said cutting support plane and a second terminus in said cutting support plane distal therefrom;

a second arcuate food contacting support member interspersed between said third generally linear food contacting support member and said fourth generally linear food contacting support member and defining a second portion of said circle circumference extending in said cutting support plane and thereby at least partially defining said cutting support plane, and having a first terminus originating adjacent to said third generally linear food contacting support member second terminus, and having a second terminus adjacent to said fourth generally linear food contacting support member second terminus;

said first portion of said circle circumference arcing away from said second longitudinal axis and thereby located in said cutting support plane entirely more distal to said second longitudinal axis than said first longitudinal axis;

said second portion of said circle circumference arcing away from said first longitudinal axis and thereby located in said cutting support plane entirely more distal to said first longitudinal axis than said second longitudinal axis; and a spacer elevating said first generally linear food contacting support member, said second generally linear food contacting support member, said third generally linear food contacting support member, said fourth generally linear food contacting support member, said first arcuate food contacting support member, and said second arcuate food contacting support member above said base;

an entirely open and unobstructed receptacle defined on a first side by said first generally linear food contacting support member, said second generally linear food contacting support member, said first arcuate food contacting support member, and said spacer, and defined on a second side by said third generally linear food contacting support member, said fourth generally linear food contacting support member, said second arcuate food contacting support member and said spacer, and defined on a third side by said base, said receptacle thereby adapted to operatively receive a portion of a food resting upon at least two of said first generally linear food contacting support member, said second generally linear food contacting support member, said first arcuate food contacting support member, said third generally linear food contacting support member, said fourth generally linear food contacting support member, and said second arcuate food contacting support member.

2. The support of claim 1, wherein said entirely open and unobstructed receptacle further comprises a first open top fluid retaining receptacle defined at least in part by said base, said first generally linear food contacting support member, said second generally linear food contacting support member, said third generally linear food contacting support member, said fourth generally linear food contacting support member, said first arcuate food contacting support member, said second arcuate food contacting support member and said spacer.

3. The support of claim 2, further comprising:
a generally vertical side wall wrapping about a perimeter of said base and extending generally vertically therefrom, in combination with said third generally linear food contacting support member, said fourth generally linear food contacting support member, said second arcuate food contacting support member, said spacer, and said base forming a second open top receptacle adjacent to said first open top receptacle; and a third open top receptacle defined by said base, said generally vertical side wall, said first generally linear food contacting support member, said second generally linear food contacting support member, said first arcuate food contacting support member and said spacer.

4. The support of claim 2, further comprising an enclosed container nesting within said first open top fluid retaining receptacle.

5. The support of claim 4, further comprising a cover adapted to operatively engage said entirely open and unobstructed receptacle and thereby enclose said entirely open and unobstructed receptacle and said enclosed container nesting therein to form a fully enclosed support.

6. A carving support facilitating cutting, preparation, storage and serving of melons and other fruits and foods, comprising:
a base;
a generally vertical side wall rising from and in combination with said base defining a first fluid retaining receptacle that is open and unobstructed and thereby adapted to operatively freely receive fluid and food therein, said generally vertical side wall having
a first pair of spaced, generally parallel and generally linear food contacting support surfaces that together define a first plane of elevation;
a second pair of spaced, generally parallel and generally linear food contacting support surfaces that are located within said first plane of elevation; and
a pair of spaced, generally arcuate food contacting support surfaces intermediate between and arcing solely outward from said first and second pairs of spaced generally parallel and generally linear food contacting support surfaces, each one of said pair of spaced, generally arcuate food contacting support surfaces defining separate and distinct portions of a common circle circumference co-planar with said first plane of elevation and having an open spacing distance therebetween that is greater than a spacing distance of at least one of said first and second pairs of spaced generally parallel and generally linear food contacting support surfaces.

7. The carving support of claim 6, further comprising a lid enclosing said first fluid retaining receptacle.

8. The carving support of claim 6, further comprising:
- a second generally vertical side wall wrapping about a perimeter of said base and extending generally vertically therefrom, said second generally vertical side wall in combination with said generally vertical side wall defining at least a second fluid retaining receptacle adjacent to said first fluid receptacle.

9. The carving support of claim 8, further comprising an enclosed container nesting within said first open top receptacle.

10. The carving support of claim 9, further comprising a cover engaging said generally vertical side wall and enclosing said first fluid receptacle to form a fully enclosed container.

11. The carving support of claim 10, wherein said enclosed container further comprises:
- an enclosed container base;
- an enclosed container generally vertical side wall rising from and in combination with said enclosed container base defining an enclosed container fluid retaining receptacle that is open and unobstructed and thereby adapted to operatively freely receive fluid and food therein, said enclosed container generally vertical side wall having
  - a third pair of spaced, generally parallel and generally linear food contacting support surfaces that together define a second plane of elevation;
  - a fourth pair of spaced, generally parallel and generally linear food contacting support surfaces that are located within said first plane of elevation; and
  - a second pair of spaced, generally arcuate food contacting support surfaces intermediate between and arcing solely outward from said third and fourth pairs of spaced generally parallel and generally linear food contacting support surfaces, each one of said second pair of spaced, generally arcuate food contacting support surfaces defining separate and distinct portions of a common circle circumference co-planar with said first plane of elevation and having an open spacing distance therebetween that is greater than a spacing distance of at least one of said first and second pairs of spaced generally parallel and generally linear food contacting support surfaces.

12. A combination melon cutting board and container, comprising:
- a base having a central area and a perimeter;
- a generally vertical outer perimeter wall circumscribing said base perimeter and rising therefrom;
- a generally vertical first divider wall rising from said base and having an arc intermediate between a first linear segment and a second linear segment, said first and second linear segments extending in opposed directions from said intermediate arc, and said arc curving generally away from said base central area;
- a first fluid retaining receptacle defined by said base, said generally vertical outer perimeter wall and said generally vertical first divider wall, said generally vertical first divider wall extending from a first location adjacent to said generally vertical outer perimeter wall to a second location adjacent said generally vertical outer perimeter wall and distal to said first location;
- a generally vertical second divider wall rising from said base and having an arc intermediate a first linear segment and a second linear segment, said first and second linear segments extending in opposed directions from said intermediate arc, and said arc curving generally away from said base central area and also generally away from said generally vertical first divider wall arc;
- a second fluid retaining receptacle defined by said base, said generally vertical outer perimeter wall and said generally vertical second divider wall, said generally vertical first divider wall extending from a third location adjacent to said generally vertical outer perimeter wall to a fourth location adjacent said generally vertical outer perimeter wall and distal to said first location;
- said generally vertical first divider wall, said generally vertical second divider wall, said container outer perimeter wall, and said base defining a third open fluid containing receptacle.

13. The combination melon cutting board and container of claim 12, further comprising an enclosed container nesting within said third open fluid containing receptacle.

* * * * *